United States Patent
Horning et al.

[11] Patent Number: 5,689,743
[45] Date of Patent: Nov. 18, 1997

[54] DIFFERENTIAL VIEWFINDER MASKS

[75] Inventors: Randy Eugene Horning; Ralph Merwin Lyon, both of Rochester, N.Y.

[73] Assignee: Eastman Kodak Company, Rochester, N.Y.

[21] Appl. No.: 659,555

[22] Filed: Jun. 6, 1996

Related U.S. Application Data

[60] Provisional application No. 60/003,238, Sep. 5, 1995.
[51] Int. Cl.[6] .......................... G03B 17/24; G03B 17/02; G03B 13/02
[52] U.S. Cl. .......................... 396/316; 396/378; 396/380
[58] Field of Search .......................... 354/105, 106, 354/159, 219, 221, 222; 396/316, 378, 380

[56] References Cited

U.S. PATENT DOCUMENTS

| | | | |
|---|---|---|---|
| 2,187,246 | 1/1940 | Nerwin | 88/1.5 |
| 2,881,684 | 4/1959 | Brohl et al. | 95/11 |
| 4,283,860 | 8/1981 | Rucker | 33/277 |
| 4,357,102 | 11/1982 | Taren et al. | 355/77 |
| 4,583,831 | 4/1986 | Harvey | 354/106 |
| 4,697,901 | 10/1987 | Wakabayashi et al. | 354/221 |
| 4,716,427 | 12/1987 | Shyu | 354/159 |
| 4,847,646 | 7/1989 | Taniguchi et al. | 354/106 |
| 4,933,694 | 6/1990 | Gates et al. | 354/222 |
| 4,973,997 | 11/1990 | Harvey | 354/106 |
| 5,066,971 | 11/1991 | Kodaira | 354/465 |
| 5,119,118 | 6/1992 | Harada et al. | 354/106 |
| 5,170,198 | 12/1992 | Cannon | 354/105 |
| 5,212,510 | 5/1993 | Baxter | 354/187 |
| 5,345,285 | 9/1994 | Hasushita et al. | 354/159 |
| 5,430,517 | 7/1995 | Zander | 354/222 |
| 5,555,058 | 9/1996 | Huang et al. | 354/222 |

*Primary Examiner*—Michael L. Gellner
*Assistant Examiner*—Daniel Chapik
*Attorney, Agent, or Firm*—Roger A. Fields

[57] ABSTRACT

A camera comprising a viewfinder for defining a field of view provided with a given aspect ratio, and a pair of front and rear masks insertable in the field of view to position respective larger and smaller openings of the front and rear masks in the field of view to change the aspect ratio of the field of view, is characterized in that a differential gear mechanism connects the front and rear masks for moving the front mask a greater extent than the rear mask is moved, to position the larger and smaller openings in the field of view.

6 Claims, 3 Drawing Sheets

DIFFERENTIAL VIEWFINDER MASKS

CROSS REFERENCE TO RELATED APPLICATION

Reference is made to and priority claimed from U.S. Provisional Application Ser. No. US 60/003,238, filed 5 Sep. 1995, entitled DIFFERENTIAL VIEWFINDER MASKS.

FIELD OF THE INVENTION

The invention relates generally to photography, and in particular to viewfinders for cameras. More specifically, the invention relates to a masking device for changing the aspect ratio of the field of view of the viewfinder in a camera.

BACKGROUND OF THE INVENTION

When taking a picture it is necessary to know not only in what direction to aim the camera but also how much of the subject will be included in the picture. For this reason practically every camera has a viewfinder of some kind.

Cameras have been proposed, such as disclosed in prior art U.S. Pat. No. 4,583,831, issued Apr. 22, 1986, that include means for taking pictures which when printed are intended to have aspect ratios different than the negatives. Each aspect ratio is selected by the photographer before he or she takes the picture. One currently popular aspect ratio in addition to the normal or full frame one, i.e. 1.5:1, in 35 mm photography is between 2:1 and 3:1. An aspect ratio between 2:1 and 3:1 provides a panoramic or stretch format print as compared to the normal format print having an aspect ratio of 1.5:1.

Since it is necessary for the photographer to know how much of the subject will be included in the print, the viewfinder in these cameras typically will have some masking device for partially masking the field of view of the viewfinder to match the aspect ratio selected by the photographer. For example, prior art U.S. Pat. No. 4,357,102, issued Nov. 2, 1982, suggests manually inserting a pair of front and rear masks in the field of view of the viewfinder to position respective larger and smaller openings of the front and rear masks in the field of view to change the aspect ratio of the field of view to the selected ratio. A problem, however, with this approach is that the pair of masks may be lost since they are not built into the camera.

SUMMARY OF THE INVENTION

A camera comprising viewfinder means for defining a field of view provided with a given aspect ratio, and a pair of front and rear masks insertable in the field of view to position respective larger and smaller openings of the front and rear masks in the field of view to change the aspect ratio of the field of view, is characterized in that:

differential means connects the front and rear masks for moving the front mask a greater extent than the rear mask is moved, to position the larger and smaller openings in the field view.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
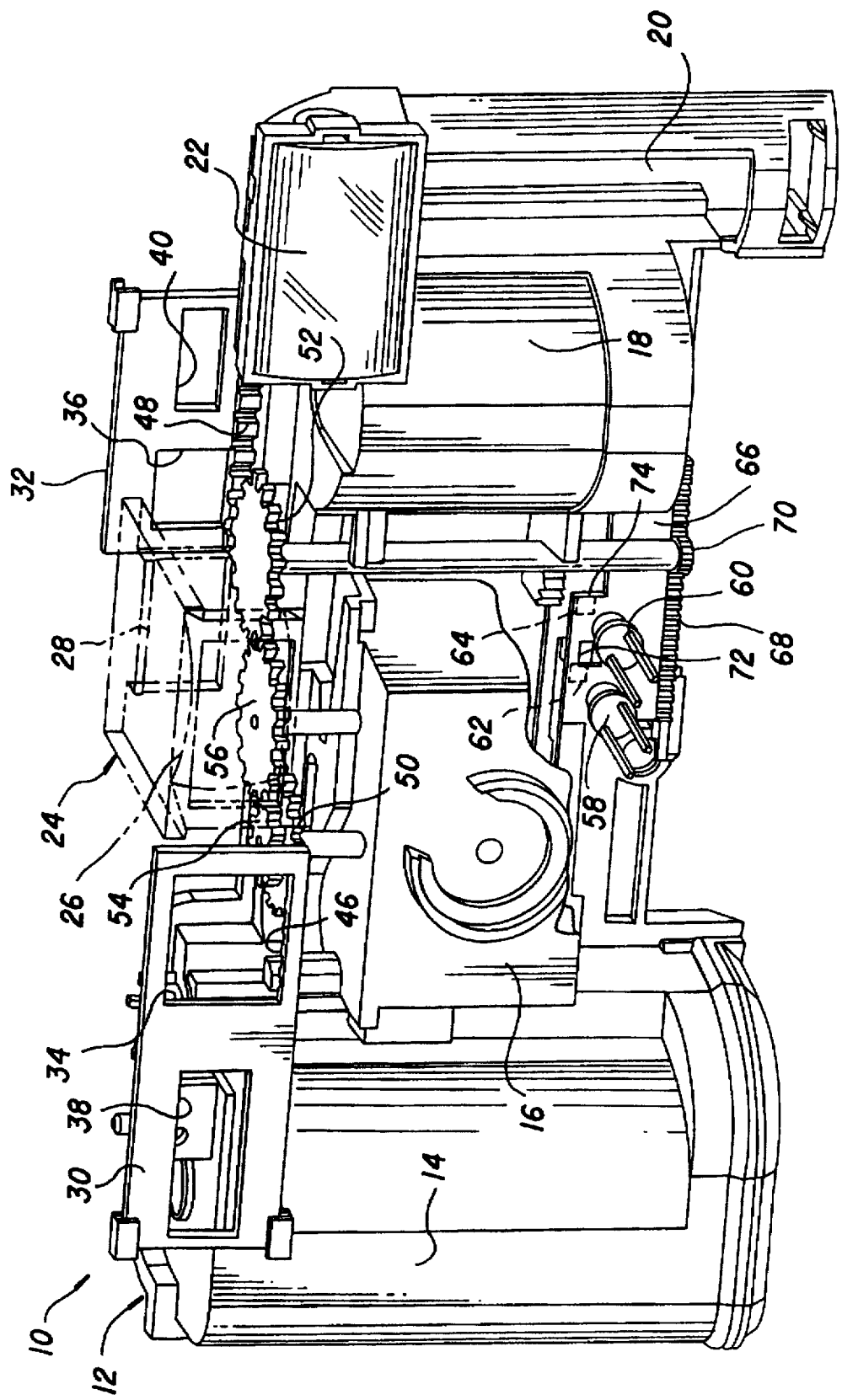
FIGS. 1, 2, and 3 are perspective views of a camera provided with a masking device for a viewfinder according to a preferred embodiment of the invention, showing the masking device in three different modes.

Referring to the drawings, FIG. 1 shows a camera 10 having a main body portion 12. The main body portion 12 comprises a cartridge chamber 14, a film exposure chamber 16, an unexposed film roll chamber 18, and a battery chamber 20 to hold one or more batteries for a built-in electronic flash 22. This arrangement is similar to many commercially available single-use cameras.

A viewfinder 24, shown in FIG. 1 in broken lines to be able to see an otherwise hidden portion of the camera 10, includes a larger front lens 26 and a smaller rear eye-lens 28 for viewing a subject to be photographed. The viewfinder 24 defines a field of view provided with an HDTV (high density television) aspect ratio of 1.78:1. See FIG. 1.

A pair of front and rear masking blades 30 and 32 include two sets of matching larger-front and smaller-rear openings 34, 36 and 38, 40. The matching larger-front and smaller-rear openings 34, 36 of one set both have a normal aspect ratio of 1.5:1. The matching larger-front and smaller-rear openings 38, 40 of the other set both have a panoramic aspect ratio of 2.85:1. The front and rear masking blades 30 and 32 are individually supported to permit each set of the larger-front and smaller-rear openings 34, 36 and 38, 40 to be separately aligned in the field of view of the viewfinder 24 to change the aspect ratio of the field of view from 1.78:1 to either 1.5:1 or 2.85:1 as shown in FIGS. 2 and 3.

Figure 2:
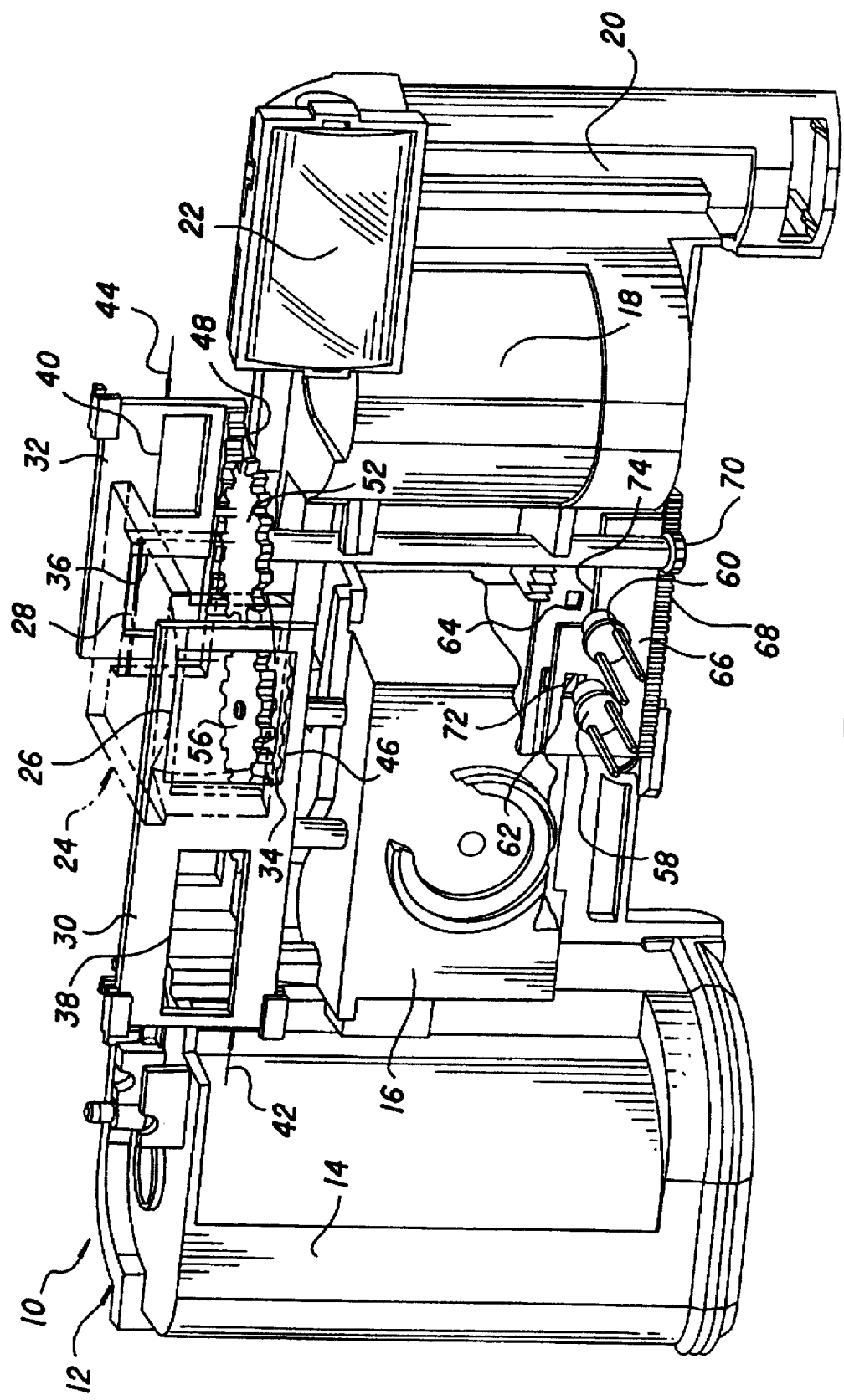
Figure 3:
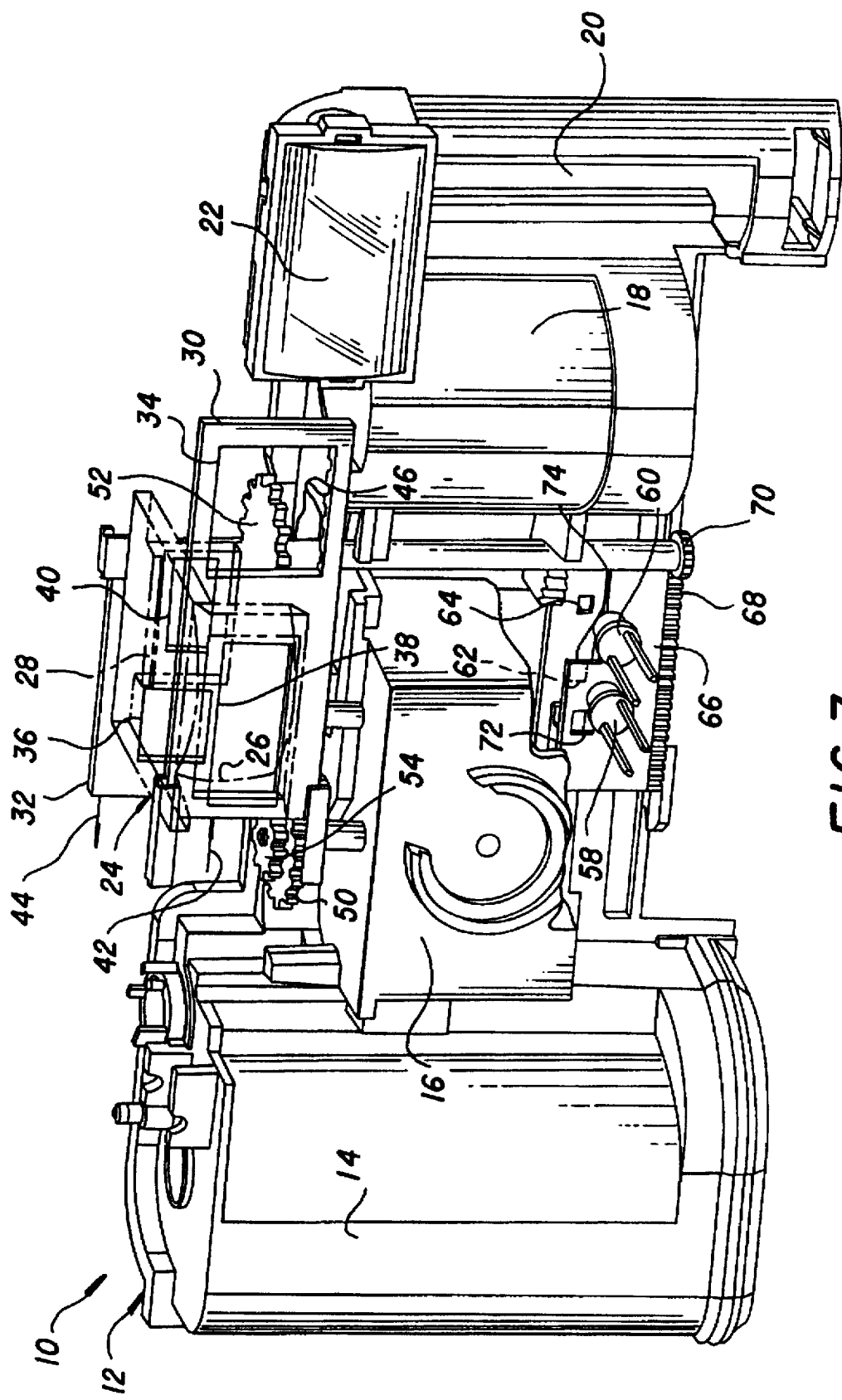

To selectively move the front and rear masking blades 30 and 32 in opposite directions 42 and 44 from respective locations in front of the cartridge chamber 14 and behind the unexposed film roll chamber 18, as shown in FIG. 1, a first increment to align the set of matching larger-front and smaller-rear openings 34, 36 in the field of view of the viewfinder 24, as shown in FIG. 2, and a second increment to align the set of matching larger-front and smaller-rear openings 38, 40 in the field of view, as shown in FIG. 3, there is provided a differential gear mechanism. The differential gear mechanism, as shown in FIG. 1, comprises respective racks 46 and 48 formed on the front and rear masking blades 30 and 32, corresponding pinions 50 and 52 rotatably supported in engagement with the separate racks, a reduction gear 54 coaxially fixed to the pinion 50, and a motion transmission gear 56 interconnecting the pinion 52 and the reduction gear. Owing to this arrangement, the front mask 30 is moved a greater extent than the rear mask 32 is moved to align each set of matching larger-front and smaller-rear openings 34, 36 and 38, 40 in the field of view of the viewfinder 24, as shown in FIG. 2 and 3.

Film encodement means such as a pair of light-emitting diodes (LED's) 58 and 60 aligned with respective apertures 62 and 64 are provided for optically recording detectable encodements on a film section, not shown, in the film exposure chamber 16 in accordance with whichever one of the sets of matching larger-front and smaller-rear openings 34, 36 and 38, 40 are aligned in the field of view of the viewfinder 24. A third mask 66, located between the two LED's 58 and 60 and the two apertures 62 and 64, has a longitudinal rack 68 in engagement with a pinion 70 coaxially fixed to the pinion 52. When the set of matching larger-front and smaller-rear openings 34, 36 are aligned in the field of view of the viewfinder 24, as shown in FIG. 2, respective openings 72 and 74 in the third mask 66 are positioned between the LED's 58 and 60 and the apertures 62 and 64 to permit the LED, s to expose a pair of dots (the equivalent of binary 1, 1) on the film section in the film exposure chamber 16. When the set of matching larger-front and smaller-rear openings 38, 40 are aligned in the field of view of the viewfinder 24, as shown in FIG. 3, only the opening 74 in the third mask 66 is positioned between the LED 60 and the aperture 64 to permit only that LED to expose a dot (the equivalent of binary 0, 1) on the film section in the film exposure chamber 16.

The invention has been described with reference to a preferred embodiment. However, it will be appreciated that variations and modifications can be effected by a person of ordinary skill in the art without departing from the scope of the invention. For example, instead of using the two LED's 58 and 60 as film encodement means other equivalents such as magnetic heads may be used. Also, in place of the two LED's 58 and 60 one LED that can direct light through both of the apertures 62 and 64 will suffice.

PARTS LIST 10. camera
12. main body portion
14. cartridge chamber
16. film exposure chamber
18. unexposed film roll chamber
20. battery chamber
22. electronic flash
24. viewfinder
26. front lens
28. rear eye-lens
30. front masking blade
32. rear masking blade
34. larger-front opening
36. smaller-rear opening
38. larger-front opening
40. smaller-rear opening
42. direction
44. direction
46. rack
48. rack
50. pinion
52. pinion
54. reduction gear
56. motion transmission gear
58. LED
60. LED
62. aperture
64. aperture
66. third mask
68. rack
70. pinion
72. opening
74. opening

We claim:

1. A camera comprising viewfinder means for defining a field of view provided with a given aspect ratio for viewing a subject to be photographed, and a pair of front and rear masks insertable in the field of view to position respective larger and smaller openings of said front and rear masks in the field of view to change the aspect ratio of the field of view from the given aspect ratio to a selected aspect ratio also for viewing the subject, is characterized further in that:

differential gear means connects said front and rear masks for moving the front mask a greater extent than the rear mask is moved to position the larger and smaller openings in the field of view.

2. A camera as recited in claim 1, wherein film encodement means is provided for recording a detectable encodement on a filmstrip in said camera, another mask can be placed between said film encodement means and the filmstrip to prevent the film encodement means from recording the detectable encodement on the filmstrip, and said differential means connects one of said front and rear masks and said other mask to place the other mask between said film encodement means and the filmstrip when the larger and smaller openings are not positioned in the field of view.

3. A camera as recited in claim 2, wherein said differential means includes respective racks on one of said front and rear masks and on said other mask and respective coaxial pinions in engagement with said racks.

4. A camera as recited in claim 1, wherein said differential gear means moves said front and rear masks in opposite directions from respective locations in front of a cartridge chamber of said camera and behind a film roll chamber of the camera to the field of view.

5. A camera as recited in claim 1, wherein said differential gear means includes respective racks on said front and rear masks and respective connected pinions in engagement with said racks.

6. A camera comprising viewfinder means defining a field of view provided with a given aspect ratio for viewing a subject to be photographed, and a pair of front and rear aspect-ratio-changing masks for changing the aspect ratio of the field of view from the given aspect ratio to a selected aspect ratio also for viewing the subject, is further characterized in that:

said front and rear masks have at least two pairs of matching front and rear openings to provide a least four opening, each of said pairs of matching front and rear openings being separately alignable in the field of view to change the aspect ratio of the field of view to a different ratio; and drive means for moving said front and rear masks a first increment in opposite directions to align one of said pairs of matching front and rear openings in the field of view and a second increment in the same directions to align another of the pairs of matching front and rear openings in the field of view.

* * * * *